United States Patent [19]
Martin

[11] 4,432,432
[45] Feb. 21, 1984

[54] AUTOMOTIVE ANTI-THEFT DEVICE

[76] Inventor: Neil J. Martin, 28150 Rose, Trenton, Mich. 48183

[21] Appl. No.: 232,541

[22] Filed: Feb. 9, 1981

[51] Int. Cl.³ .................. B60R 25/02; B60R 25/08
[52] U.S. Cl. ..................... 180/287; 70/238; 254/133 R; 254/DIG. 4
[58] Field of Search ............ 180/287, 272; 70/238, 70/203, 255; 254/DIG. 5, DIG. 4, 133, 108, 109, 110, 111

[56] References Cited

U.S. PATENT DOCUMENTS

| | | | |
|---|---|---|---|
| 1,558,110 | 10/1925 | Menchen | 70/238 |
| 1,691,822 | 11/1928 | Lindmeyer | 254/DIG. 5 |
| 1,796,173 | 3/1931 | Warren | 254/DIG. 4 |
| 2,193,424 | 3/1940 | Johnson | 254/111 |
| 2,529,292 | 11/1950 | Greenfield | 254/133 R |
| 2,812,669 | 11/1957 | Reff | 254/DIG. 5 |
| 3,099,435 | 7/1963 | Nixon | 254/133 R |
| 3,108,784 | 10/1963 | Ulm | 254/110 |
| 3,245,239 | 4/1966 | Zaidener | 70/238 |
| 3,435,646 | 4/1969 | Michnoff | 70/203 |
| 3,690,131 | 9/1972 | Davis | 70/238 |

FOREIGN PATENT DOCUMENTS 929857 1/1948 France ........................ 70/238

Primary Examiner—David M. Mitchell
Attorney, Agent, or Firm—Joseph J. Goluban

[57] ABSTRACT

A device and method utilizing a standard automotive vehicle bumper jack, including a lower and upper jack adaptor and padlock. The lower jack adaptor engages both the bottom of the bumper jack and the brake pedal of the automotive vehicle. The upper jack adaptor engages both the top of the bumper jack and the steering wheel of the automotive vehicle. Once the jack and the adaptors are correctly positioned between the vehicle's brake pedal and the steering wheel, the bumper jack is activated to produce a downward positive pressure on the automotive vehicle's brake pedal, thus locking all four (4) wheels thereof. A padlock is inserted into one of the bumper jack apperatures and locked to prohibit the disengagement of the bumper jack.

An alternative embodiment consists of a unitary device and method utilizing a cylindrical shaft body having a screwing mechanism and a shaft lock. The lower portion having a forked end that engages the vehicles brake pedal and an upper portion having a finger to engage the steering wheel of the vehicle. Once installed the unitary device is locked.

25 Claims, 10 Drawing Figures

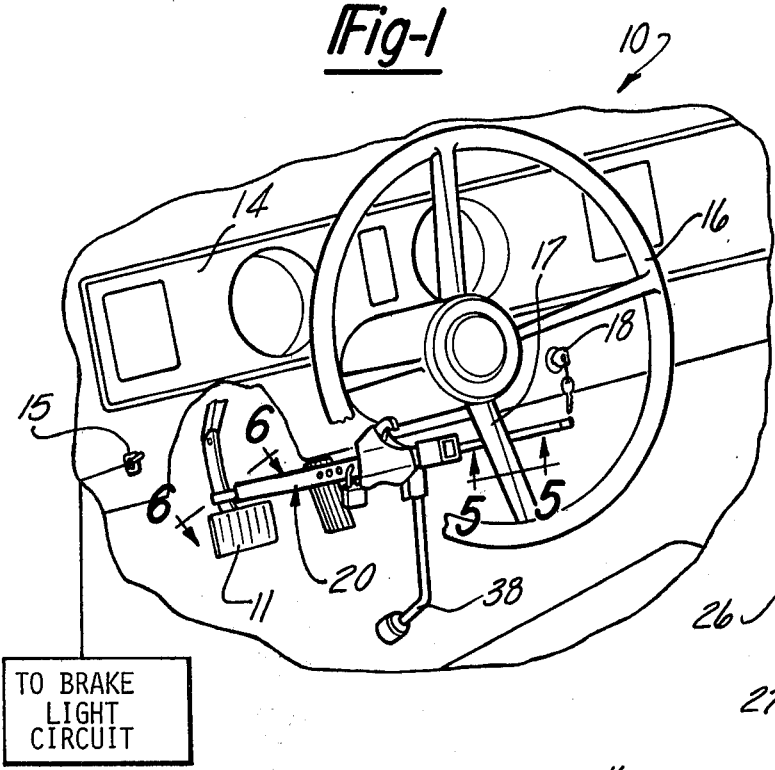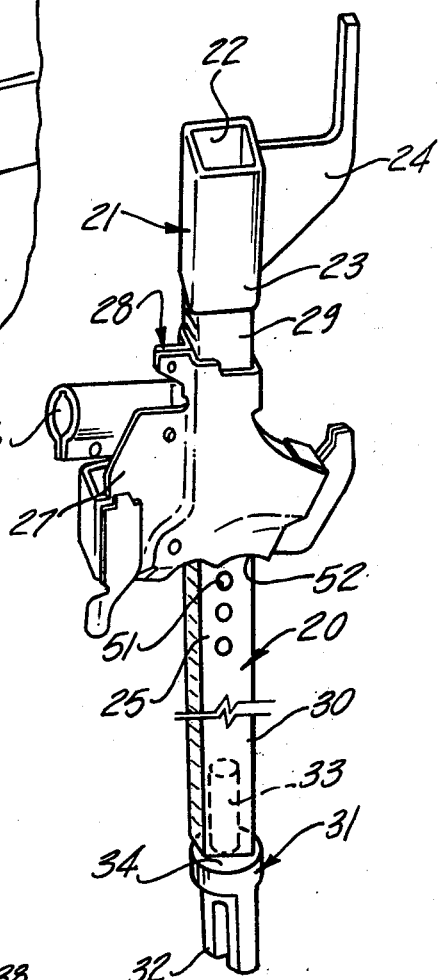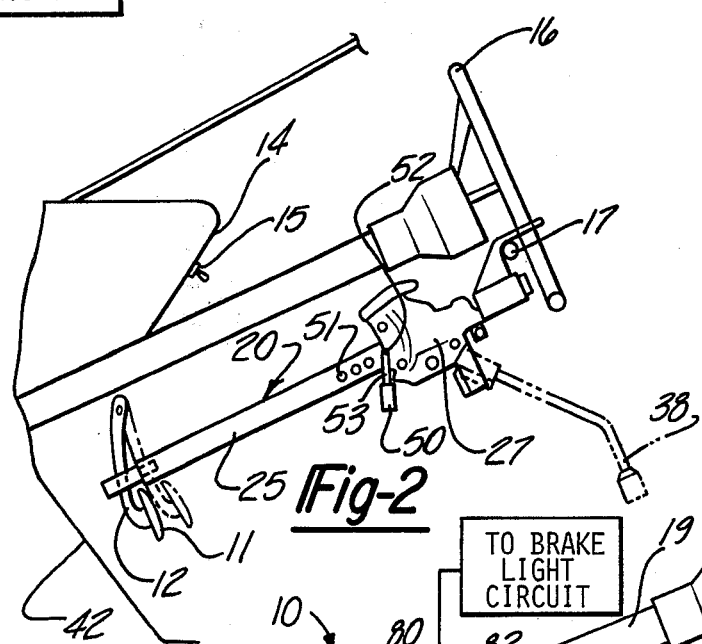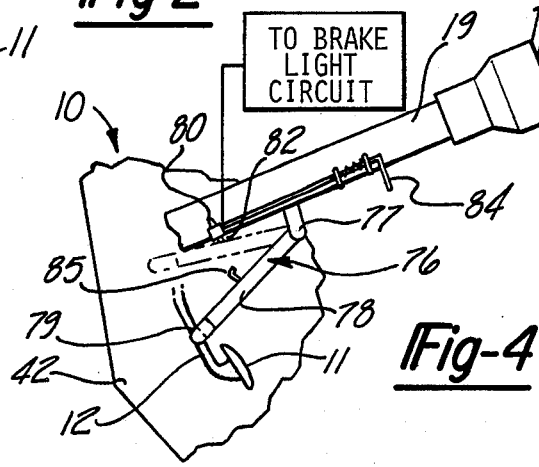

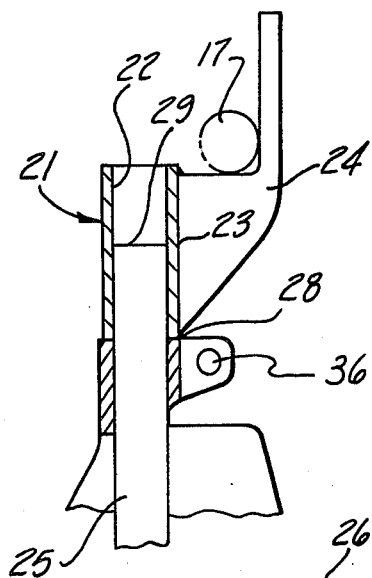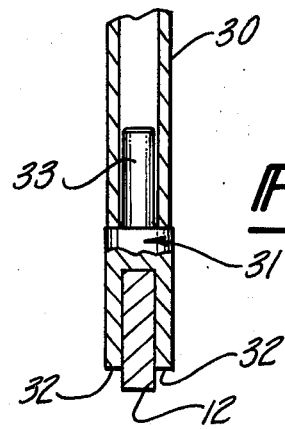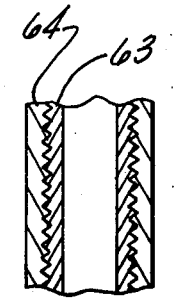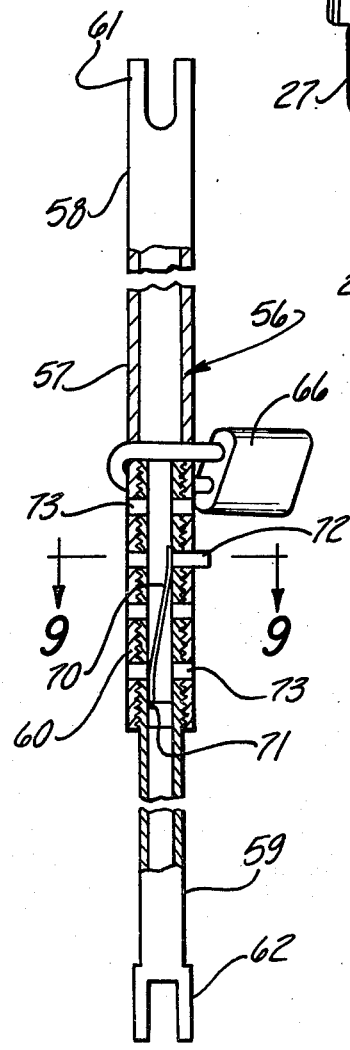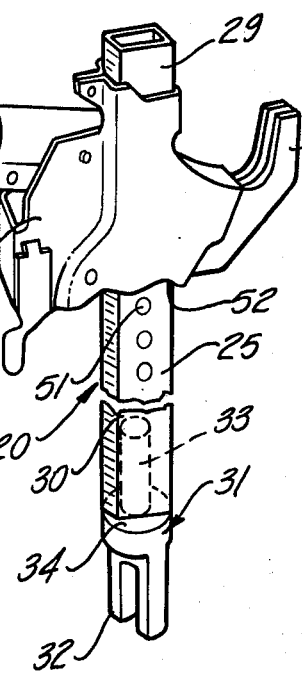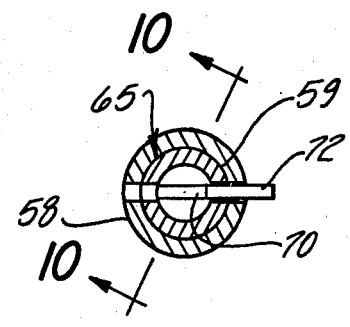

AUTOMOTIVE ANTI-THEFT DEVICE

BACKGROUND OF THE INVENTION

The present invention relates to an automotive anti-theft device, and more specifically to a novel automotive anti-theft device which utilizes an ordinary automobile bumper jack and handle (lug wrench) in combination with two (2) adaptors. The disclosed device answers a long felt need for an economical and effective automotive anti-theft device which is capable of being utilized with either a new or used automobile.

Applicant has invented both an economical and efficient automotive anti-theft device which answers a long felt need for stopping the "theft" of automobiles by the use of wreckers and/or tow trucks. More and more automobiles are being stolen by thieves using wreckers because the many security devices being used today have made it more difficult to break into automobiles and require more time to deactivate the security devices, thus, forcing the thieves to steal the whole automobile and then later break into it at a location of their own choosing, far away from the theft location.

The present invention, as disclosed by the Applicant, actually locks all four (4) wheels of the automobile, thus, making it virtually impossible for even a wrecker or tow truck to move the automobile. Any wrecker which would try to tow or push an automobile with all four (4) brakes locked would either ruin its transmission if automatic, or burn out the clutch with a standard floor shift. Obviously, no one will ever be able to completely stop the theft of automobiles, but the Applicant believes that it is possible to discourage the theft thereof, by making it much more difficult to steal the automobile, by making it more noticeable and/or requiring more time to steal it, therefore, giving the owner of the automobile and law enforcement personnel a better chance of stopping the theft.

Applicant has been self-employed for over twenty (20) years in the business of repossessing automobiles for banks, savings and loan associations, and credit unions, and has been extremely successful in defeating, at one time or another, all the anti-theft devices presently on the market, because none of these devices can actually stop a thief or a person in the repossession business who uses a tow truck.

However, Applicant's invention can stop the automobile from being towed or pushed by locking both the steering wheel and all four (4) wheels of the automobile at the same time. Any thief attempting to tow or push an automobile with all four (4) wheels locked would do extreme damage to their tow truck and at the same time attract immediate attention to themselves, due to the resultant loud noises created by the pulling of the immobilized automobile. Further, a thief using a tow truck with an automatic transmission probably would not even be able to move the automobile, depending on its size, since most of the weight thereof would be on the immobilized wheels in contact with the pavement surface, resulting in a large frictional drag force to overcome, thus effectively stopping the automobile from moving.

A review of the prior art will show that there have been many products on the market which have attempted to stop the theft of automobiles, but none of these anti-theft devices have been able to stop the towing or pushing of the automobile. The prior art would include such devices as steering column locks, burglar alarms, automotive hood locks, trunk guards, and ignition lock guards, with none of these devices being capable of stopping the towing or pushing of the automobile, as is Applicant's invention.

Thus, one of the objects of the present invention is to provide an automotive anti-theft device which is economical.

A further object of the present invention is to provide an automotive anti-theft device which prohibits the towing or pushing of an automobile by a wrecker.

A further object of the present invention is to provide an automotive anti-theft device which utilizes an ordinary automobile bumper jack, combined with two (2) adaptors.

A further object of the present invention is to provide an automotive anti-theft device which is capable of being utilized in all automobiles.

Another object of the present invention is to provide an automotive anti-theft device which has both an upper and lower jack adaptor made from a durable plastic material.

Another object of the present invention is to provide a device of the foregoing nature which is capable of effectively deterring the theft of an automobile.

Another object of the present invention is to provide an anti-theft device which utilizes an adaptor which easily fits any existing automobile bumper jack.

Still another object of the present invention is to provide an automotive anti-theft device with means to shut off the brake lights once the device is activated.

Still another object of the present invention is to provide an anti-theft device which utilizes an ordinary automobile bumper jack with one adaptor.

Still another object of the present invention is to provide an anti-theft device which has a built-in mechanical attachment connected to the automobile steering column which is capable of locking all four (4) of the automobile wheels.

Still another object of the present invention is to provide an automotive anti-theft device which is of a one-piece construction.

Still another object of the present invention is to provide an automotive anti-theft device which utilizes a coupling screwing mechanism to produce the longitudinal axial force.

Further objects and advantages of this invention will be apparent from the following description and appended claims, reference being made to the accompanying drawings forming a part of this specification, wherein like reference characters designate corresponding parts in the several views.

STATEMENT OF PATENTABILITY

As part of the disclosure of the present invention, I wish to make the following "Statement of Patentability" under Rule 97 of the U.S. Patent and Trademark Office.

I have been in the repossession business for approximately twenty (20) years and have been successful in repossessing all makes of automobiles which were equipped with many different types of anti-theft devices. During these twenty (20) years, I have myself utilized most of the many available devices sold by locksmith supply companies to gain entrance into automobiles, such as lock openers for car doors. I have become personally aware of the leader and possibly the largest locksmith supply company in the world, the Lawrence Locksmith Supply Corp., which sells all types of automobile security devices.

Although I have not made a search of patentability of my invention, I am personally aware of the Lawrence Locksmith Supply Corp. advertising literature, and I wish to bring to the attention of the U.S. Patent and Trademark Office what I believe to be the closest prior art of which I am presently aware.

After a careful review of the Lawrence Locksmith Supply Corp. advertising literature, I am of the opinion that the only prior art reference which is material to the examination of the present invention would be the device manufactured under the brand name of "Krook-lok". I have included a copy of advertising literature which shows the use of the "Krook-lok" device. The device consists of a locked bar that hooks together the brake pedal and steering wheel, which prohibits the use of either the steeriing wheel or the brakes. The advertising literature indicates that the "Krook-lok" device will "Reduce the threat of your car being stolen.—The sight of a Krook-lok can help avoid any damage caused by a thief forcing an entry."

It is readily apparent, by reference to advertising literature, that the "Krook-lok" device works exactly the opposite of my automotive anti-theft device and, therefore, does not function the same way. The "Krook-lok" device only deters a thief from driving the automobile, but in no way does it function to stop the theft of the automobile by a tow truck, since, unlike the case with my invention, the automobile may be easily towed or pushed away. I am, therefore, of the opinion that the "Krook-lok" device neither anticipates my invention, nor does it make my invention obvious, and for these reasons should not be considered a relevant prior art reference.

BRIEF DESCRIPTION OF THE DRAWINGS

FIG. 1 is a fragmentary perspective view of the interior of an automobile passenger compartment showing an automotive anti-theft device embodying my invention.

FIG. 2 is a partial elevational view of an automobile passenger compartment interior showing the application of an automotive anti-theft device and the depression of the vehicle brakes.

FIG. 3 is an exploded view of a construction embodying my invention and utilizing an ordinary automobile bumper jack and a lower and upper jack adaptor.

FIG. 4 is an elevational view of an automobile passenger compartment showing another embodiment of my invention which has a built-in mechanical attachment connected to the automobile steering wheel column.

FIG. 5 is a cross sectional view, taken in the direction of the arrows along line 5—5 of FIG. 1, showing the upper adaptor engagement of the steering wheel spoke.

FIG. 6 is a cross sectional view, taken in the direction of the arrows along line 6—6 of FIG. 1, showing the bottom adaptor engagement of the brake pedal arm.

FIG. 7 is an exploded view of another embodiment of my invention partially in section which utilizes a unitary jacking device having a coupling screwing mechanism to produce the longitudinal axial force, and a permanently attached upper and lower adaptors which can engage the brake pedal and steering wheel spoke.

FIG. 8 is an exploded view of a construction embodying my invention utilizing an ordinary automobile bumper jack and a lower jack adaptor.

FIG. 9 is a cross sectional view, taken in the direction of the arrows along line 9—9 of FIG. 7, showing the threaded coupling screwing mechanism with the pin spring lever engagement.

FIG. 10 is a cross sectional view, taken in the direction of the arrows along line 10—10 of FIG. 9, showing the intercourse of the threaded coupling screwing mechanism.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description and not of limitation.

DESCRIPTION OF THE PREFERRED EMBODIMENTS

Referring to FIG. 1, a fragmentary perspective view of an automobile passenger compartment interior 10 is shown with my automotive anti-theft device generally designated by numeral 20. FIG. 1 shows the anti-theft device 20 being disposed between the brake pedal 11 and the steering wheel 16, while mounted on the automobile dash 14 is shown a standard toggle switch 15 known in the art. By attaching the toggle switch 15 to the wiring of the brake lights (not shown), the brake lights may be turned on or off at will by the automobile operator.

Referring now to FIG. 3, there is shown an exploded view of a construction embodying my automotive anti-theft device 20 consisting of an ordinary bumper jack 25 with removable lug wrench 38 (not shown) and an upper jack adaptor 21 and lower jack adaptor 31. The upper jack adaptor 21 has a stem 23 having a hollow rectangular interior 22, which slips over the top 29 of the bumper jack 25, as can be best seen in FIG. 5, and can be made of any rigid material known in the art, including, and not limited to, steel, cast iron, aluminum and plastics. The upper jack adaptor 21 also has a stem 23 onto which a finger 24 is suitably attached and so constructed that it can effectively engage the steering wheel spoke 17.

The lower jack adaptor 31 consists of a forked stem 32 and cylindrical pin 33 suitably connected at the plane surface 34. The cylindrical pin 33 fits inside the bottom portion 30 of the bumper jack 25, as can be best seen in FIG. 6, while the forked stem 32 fits over the brake pedal arm 12 of the vehicle brake pedal 11. As in the case of the upper jack adaptor 21, the lower jack adaptor 31 can be made of any rigid material known in the art including, and not limited to, steel, cast iron, aluminum and plastics.

However, while the use of any of the many known materials commonly used in the manufacturing industry would be acceptable to the construction of either adaptor, for reasons of economy and ease of manufacture, I would prefer the use of any of the molded plastics which have high strength and impact resistant characteristics commonly known in the art. Thus, it can be readily seen that my preferred embodiment of my automotive anti-theft device 20 utilizes any ordinary bumper jack 25 in combination with a conversion kit consisting of a lower jack adaptor 31 and upper jack adaptor 21.

Referring now to FIG. 2, which is a partial elevational view of the interior of an automobile passenger compartment in which my automotive anti-theft device 20 has been installed, one will notice that the bumper jack 25 is activated the same way as one would normally do when jacking up a car to change a tire, and when so activated the brake pedal 11 will move closer to the floor 42 of the automobile, thus locking all four (4) wheels (not shown) of the automobile. It is, therefore, possible for even a nonadult person to easily install and activate the automotive anti-theft device 20 to effectively lock all four (4) of the automobile's wheels and the steeriing wheel 16, due to the extremely large compressive force produced by the easily activated bumper jack 25.

Further, being that my automotive anti-theft device 20 is clearly visible and, therefore, tempting for a thief to break into the automobile passenger compartment and try to deactivate the bumper jack 25, I have included as part of my invention and do now disclose as part of my preferred embodiment the use of a lock 50 which may be inserted into one of the bumper jack holes 51 closest to the end 52 of bumper jack 25 jacking mechanism 27. The holes 50 may be of any size which will accommodate a standard lock shaft 53, near the top portion of the bumper jack 25. It being, therefore, possible to effectively secure my automotive anti-theft device 20 by inserting a lock 50 into the closest hole 51 to the jacking mechanism 27, which would prohibit the disengagement or the unjacking thereof.

Once the jacking mechanism 27 is secured, as above described, with my automotive anti-theft device 20 activated, it would be virtually impossible to disengage it, even with a ten pound hammer without breaking the steering wheel 16, since the compressive axial force produced by an activated bumper jack 25 would be equivalent to 4,000 or 5,000 lbs.

While the preferred embodiment of my automotive anti-theft device 20 consists of a conversion kit utilizing both upper 21 and lower 31 jack adaptors, it is possible with some models of bumper jacks 25 to have a conversion kit for the bumper jack 25 utilizing only a lower jack adaptor 31.

Referring now to FIG. 8 showing an exploded view of a construction utilizing an ordinary automobile bumper jack 25 with only a lower jack adaptor 31, it is easily recognizable that the only difference between the disclosed embodiment of FIG. 8 and FIG. 3 is that no upper jack adaptor 21 is necessary, since the bumper jack hook 39 can be used in lieu thereof to hook unto the steering wheel spoke 17. Thus, for some models of bumper jack 25, a conversion kit consisting only of a lower jack adaptor 31 in combination with said bumper jack 25 will result in an economical and effective automotive anti-theft device 20.

Applicant, having already described the best mode contemplated for carrying out his invention in the form of a conversion kit for an ordinary bumper jack, now wishes to describe the best method of how to use the same. Once the driver of the automobile has selected the best location to park his automobile, the driver, with the engine still running, would insert the cylindrical pin 33 of the lower jack adaptor 31 into the inside of the bottom 30 of bumper jack 25, and then carefully place the forked stem 32 of the lower jack adaptor 31 over the brake pedal arm 12, as best seen by referring to FIG. 6 (it being assumed that the bumper jack 25 has already been removed from the storage area of the automobile and placed within the passenger compartment).

The advantage of leaving the engine running during the installation of the automotive anti-theft device 20 is that, for automobiles having power brakes, there would be an additional resultant back pressure exerted on the brake pedal 11 which would produce even more of a compressive axial force on the device 20. Obviously, for those automobiles not having power brakes, the engine may be shut of before beginning the installation sequence of my invention.

Next, with the lower jack adaptor 31 in its proper location, and the automobile still running, the upper jack adaptor 21 is slipped over the top 29 of the bumper jack 25 and placed in contact with the upper end 28 of the jacking mechanism 27. Once the upper jack adaptor 21 is securely in place, the assembled device 20 is properly rotated and/or aligned so that the upper jack adaptor 21 and finger 24 will engage and hook around the steering wheel spoke 17, as can be best seen in FIG. 5

Applicant wishes to make it clear that he does not wish his invention to be limited solely to the use of both an upper 21 and lower jack adaptor 31, since many of the bumper jacks 25 constructed today have their own bumper jack hook 39 which would function and perform the same utility as Applicant's upper jack adaptor 21. Therefore, for those models of bumper jacks 25 for which no upper adaptor 21 is necessary, the above described steps on installing my automotive anti-theft device will be exactly the same, except that once the lower jack adaptor 31 is placed in its proper location, the assembled device 20 is properly rotated and/or aligned so that the bumper jack hook 39 engages and hooks the steering wheel spoke 17.

Once the bumper jack 25 adaptor or adaptors are correctly positioned, the driver or any other person in the car would insert the removable lug wrench 38 into the jacking mechanism 27, and connection 26 jack the bumper jack 25 the same as if he were to change a tire on the car until the brake pedal 11 could no longer be depressed towards the floor 42 of the automobile, thus, effectively locking all four (4) wheels of the automobile and the steering wheel 16.

Finally, with my automotive anti-theft device 20 securely activated and functioning, the driver would insert the lock shaft 53, of lock 50 into the nearest hole 51 to the end 52 of the jacking mechanism 27, and then lock it, so that the bumper jack 25 could not be unjacked. Once the device 20 is secured, both the automobile engine and the brake lights would be shut off by means of an ignition key 18 and toggle switch 15 respectively. While Applicant has described what he believes to be the preferred sequence for the proper use of his invention, obviously, other sequences are possible and may be ever preferred, depending on whether the subject automobile has power steering, power brakes or an ignition steering wheel automatic lock and, therefore, Applicant does not intend to strictly limit the use of his invention to the above-described installation sequence.

Further, although Applicant's preferred embodiment utilizes a standard bumper jack 25, in combination with a conversion kit consisting of either a lower 31 and upper jack adaptor 21, or only a lower jack adaptor 31, Applicant also wishes to disclose the use of a unitary automotive anti-theft device 56 which utilizes either a cylindrical shaft body 57, or bumper jack 25.

Referring to FIG. 7, which is an exploded elevational view partially in section, there is shown such device 56 comprising a cylindrical shaft body 57 having an upper portion 58 and a lower portion 59, and a jacking screwing mechanism 60 adapted to advance along said cylindrical shaft body 57, including a hook 61 which is permanently attached to the upper portion 58 of the cylindrical shaft body 57 adapted to engage steering wheel spoke 17, and fork 62, which is permanently attached to the lower portion 59 of the cylindrical shaft body 57 adapted to engage the pedal arm 12 of the automotive vehicle.

The jacking screwing mechanism 60 consists of a built-in threaded coupling 65 which is standard in the art, and operates as any standard male 63 and female 64 threaded coupling on the upper 58 and lower 59 portions of the cylindrical shaft body 57 respectively, which produces a jacking effect by the elongation of the cylindrical shaft body 57 as the threaded coupling is rotated, thus producing an axial longitudinal compressive force which causes the displacement of brake pedal 11 towards the vehicle floor 42, thus effectively locking all four (4) of vehicle wheels and the steering wheel 16 at the same time.

As in the case of a conversion kit for an ordinary bumper jack 25 using a lower adaptor 31, the fork 62 should be so constructed to allow for the circular rotation of the cylindrical shaft body 57 so that the hook 61 can properly engage the steering wheel spoke 17 when the cylindrical shaft body 57 is of a unitary or one-piece construction.

However, when the cylindrical shaft body 57 has a jacking screwing mechanism 60 utilizing a threaded coupling 65, it is possible to freely rotate the cylindrical shaft body 57, thus allowing the effective engagement by hook 61 of the steering wheel spoke 17, without the necessity of fork 62 being rotatable.

The screwing mechanism 60 is provided with a spring lever 70 which is suitably attached at one end 71 to the interior of the lower portion 58 of the male end 63 of the cylindrical shaft, which has a pin 72 that protrudes out of any of the many shaft holes 73 disposed along both the upper 58 and lower 59 portions of the cylindrical shaft.

The shaft holes 73 are placed on opposite sides of both the upper 58 and lower 59 portions of the cylindrical shaft for two (2) reasons. First, it allows for the effective engagement of pin 72 for each 180 degree rotation of the cylindrical shaft body 57 as the length of my modified automotive anti-theft device 56 is either extended or shortened. Second, as in the case of the automotive anti-theft device 20, it is desirable to prevent the deactivation of the device 56 by the insertion of a shaft lock 66 into and through any of the shaft holes 73 located on opposite sides of both the upper 58 and lower 59 portions of the cylindrical shaft assembly, therefore, effectively and economically prohibiting the disengagement of the unitary automotive anti-theft device 56 once installed in any automotive vehicle.

While the use of any of the many known rigid materials common in the manufacturing art is acceptable, such as steel, cast iron, aluminum or plastic, Applicant prefers the use of any of the high strength and impact resistance plastics, commonly known in the art for the unitary automotive anti-theft device 56.

Applicant, having already described in the above specification the best mode contemplated for his unitary automotive anti-theft device 56, and having also described the best mode of using the automotive anti-theft device 20 in combination with a conversion kit utilizing either a lower or upper bumper jack adaptor or both, now wishes to describe the best method of using the unitary automotive anti-theft device 56.

Once the driver of the vehicle has selected the best location to park his automobile, with the engine either off or running (for reasons previously being described in the above specification), the fork 62 of the unitary automotive anti-theft device 56 is placed over the brake pedal arm 12.

Next, the device 56 is properly rotated and/or aligned by applying either a clockwise or counterclockwise force to the upper portion 58 of the cylindrical shaft body 57, so that the hook 61 will effectively engage the steeering wheel spoke 17.

After the device 56 has been correctly positioned by utilizing the screwing mechanism 60 provided by threaded coupling 65, and the cylindrical shaft body 57 has caused the activation of all four (4) of the vehicle's brakes, thus effectively locking all four (4) wheels of the automobile and the steering wheel 16, the pin 72 is allowed to engage the nearest shaft hole 73.

Once the unitary automotive anti-theft device 56 has been completely installed, the automobile engine and brake lights are shut off by means of an ignition key 18 and toggle switch 15 respectively.

Finally, the device 56 may effectively be secured by means of a shaft lock 66 being inserted into and through any of the many shaft holes 73.

While Applicant has described what he believes to be the preferred sequence for the proper use of his invention, obviously other sequences are possible and may even be preferred, depending on whether the subject automobile has power steering, power brakes or an ignitiion steering wheel automatic lock and, therefore, Applicant does not intend to strictly limit the use of his invention to the above-described installation sequence.

Referring now to FIG. 4 which discloses a fragmented partial elevational view of an automobile passenger compartment interior 10 showing another embodiment of my automotive anti-theft device 20 using a built-in mechanical hinged device 76 to lock the four (4) wheels of the automotive vehicle, the mechanical hinged device 76 is connected to the vehicle steering wheel column 19 by suitable means known in the art, and is provided with a hinge pin 77 which allows the downward rotation of level arm 78. To the lower end of the lever arm 78 is suitably attached by means known in the art a U-fork 79 which, when deflected to its lowest point, engages the brake pedal arm 12 and causes the activation of all four (4) brakes of the automotive vehicle, and also the subsequent locking of all four (4) of the vehicle wheels.

As can be seen by reference to FIG. 4 no locking device is used for this embodiment, since unlike the conversion kit with bumper jack or the unitary anti-theft device which are patently visible to anyone outside the automotive vehicles passenger compartment, the embodiment disclosed in FIG. 4 is smaller and almost not visible.

Further attached to the device 76 is a column toggle switch 80 which shuts off the vehicle brake lights when the lever arm 78 is rotated away from the electrical contact 82 in a similar activation sequence as above already described.

When the device 76 is not in use, the lever arm 78 may be stored by rotating it upwardly to the highest point to engage the lock release rod 84 by lever arm prong 85.

It will be appreciated that numerous changes and modifications can be made to the embodiments disclosed herein without departing from the spirit and scope of this invention. Thus, by abandoning the prior art use of anti-theft devices, which only discourage the breaking and entry of an automobile, Applicant, by virtue of the above-described construction, has been successful in achieving the objects of the invention listed above.

I claim:

1. An automotive anti-theft device conversion kit for a standard automotive bumper jack of the type having a shaft, a jacking mechanism, a jack hook, apertures and removable lug wrench for locking the wheels of an automotive vehicle by installing the bumper jack with conversion kit between the brake pedal and steering wheel so as to depress the brake pedal of the automotive vehicle, said conversion kit comprising, a lower jack adaptor having a forked stem portion being adapted to engage the brake pedal arm of an automotive vehicle, a top portion adapted for attachment to the bottom end of a standard bumper jack shaft, and lock means for engaging the bumper jack to prevent the retraction or unjacking of the bumper jack once the brake pedal is depressed.

2. The anti-theft device conversion kit as defined in claim 1, wherein said top portion of the lower jack adaptor has a pin portion being adapted to fit into the bottom of a standard automotive bumper jack.

3. The automotive anti-theft device conversion kit as defined in claim 2, wherein said lower jack adaptor pin portion is cylindrical.

4. The automotive anti-theft device conversion kit as defined in claim 3, wherein said lower jack adaptor is made from a durable high strength plastic material.

5. The automotive anti-theft device conversion kit as defined in claim 4, said lock means comprising, a standard padlock inserted into a bumper jack aperture.

6. An automotive anti-theft device conversion kit for a standard automotive bumper jack of the type having a shaft, a jacking mechanism, apertures and a removable lug wrench for locking the wheels of an automotive vehicle by installing the bumper jack with conversion kit between the brake pedal and steering wheel so as to depress the brake pedal of the automotive vehicle, said conversion kit comprising, an upper jack adaptor having a stem, a hollow interior being adapted to attach to the top end of a standard bumper jack shaft and a finger portion being adapted to effectively engage the steering wheel of an automotive vehicle, a lower jack adaptor having a forked stem portion being adapted to engage the brake pedal arm of an automotive vehicle and a top portion adapted for attachment to the bottom end of a standard bumper jack shaft, and lock means for engaging the bumper jack to prevent the retraction or unjacking of the bumper jack once the brake pedal is depressed.

7. The automotive anti-theft device conversion kit as defined in claim 6, wherein said upper jack adaptor is adapted to fit over the outside of the top portion of a standard automotive bumper jack shaft.

8. The automotive anti-theft device conversion kit as defined in claim 7, wherein the upper jack adaptor has a rectangular hollow interior.

9. The automotive anti-theft device conversion kit as defined in claim 8, wherein said top portion of the lower jack adaptor has a pin portion being adapted to fit into the bottom of a standard automotive bumper jack.

10. The automotive anti-theft device conversion kit as defined in claim 9, wherein said lower jack adaptor pin portion is cylindrical.

11. The automotive anti-theft device conversion kit as defined in claim 10, wherein said upper and lower adaptors are made from a durable high strength plastic material.

12. The automotive anti-theft device conversion kit as defined in claim 11, said lock means comprising, a standard padlock inserted into a bumper jack aperture.

13. A unitary automotive anti-theft device for locking the wheels of an automotive vehicle by installing said device between the brake pedal and steering wheel so as to depress the brake pedal of the automotive vehicle, comprising, a body having an upper and lower portion with apertures, a jacking mechanism adapted to advance along said body portion, an upper attachment to said upper body portion having a finger adapted to engage the steering wheel of an automotive vehicle, said upper attachment includes a stem, a hollow interior and a finger portion, said hollow interior being adapted to be attached to the top end of said body and said finger portion adapted to engage the steering wheel of an automotive vehicle, a lower attachment to said lower body portion having a forked member adapted to engage the brake pedal arm of an automotive vehicle, and a standard padlock being inserted into one of said body apertures to prevent the retraction of said jacking mechanism.

14. The device defined in claim 13, wherein said lower attachment includes a forked stem portion being adapted to engage the brake pedal arm of an automotive vehicle and a top portion being adapted for attachment to the bottom end of said body.

15. The device defined in claim 14, wherein said upper attachment fits over the outside of the top portion of said body.

16. The device defined in claim 15, wherein the upper attachment has a rectangular hollow interior.

17. The device defined in claim 16, wherein said lower attachment has a pin portion being adapted to fit into the bottom of said body.

18. The device defined in claim 17, wherein said lower attachment pin portion is cylindrical.

19. The device defined in claim 18, wherein said upper attachment is adapted to fit over the outside of the top portion of said body.

20. The device defined in claim 19, wherein said upper and lower attachments are made from a durable high strength plastic material.

21. The device defined in claim 20, wherein said body consists of a standard automotive vehicle bumper jack shaft.

22. The device defined in claim 13, wherein the body portion consists of a cylindrical shaft and the upper and lower attachments are permanently attached thereto.

23. The device defined in claim 22, wherein said jacking mechanism has a built-in threaded coupling which is capable of producing a jacking effect by the elongation thereof.

24. The device defined in claim 23, wherein said jacking mechanism threaded coupling consists of a male and female type construction which allows the circular rotation of the cylindrical shaft.

25. The device defined in claim 24, wherein the entire device is made from a durable high strength plastic material.

* * * * *